United States Patent [19]

Maimets

[11] Patent Number: 5,725,026
[45] Date of Patent: Mar. 10, 1998

[54] CONDUIT LINING SYSTEM AND METHOD OF LINING A CONDUIT

[75] Inventor: Lembit Maimets, Richmond Hill, Canada

[73] Assignee: Link-Pipe, Inc., Ontario, Canada

[21] Appl. No.: 744,668

[22] Filed: Nov. 6, 1996

Related U.S. Application Data

[60] Provisional application No. 60/006,496, Nov. 9, 1995.
[51] Int. Cl.$^6$ ..................................................... F16L 55/18
[52] U.S. Cl. ........................... 138/97; 138/98; 264/268; 405/150.1
[58] Field of Search .................... 138/98, 97, 128, 138/151, 166; 166/285, 277, 387; 405/150, 154; 264/269, 36, 516, 573; 156/287

[56] References Cited

U.S. PATENT DOCUMENTS

| | | | |
|---|---|---|---|
| 4,715,747 | 12/1987 | Behrens | 138/97 X |
| 5,004,405 | 4/1991 | Driver et al. | 138/98 |
| 5,119,862 | 6/1992 | Maimets et al. | 138/97 X |
| 5,163,481 | 11/1992 | Catallo | 138/97 X |
| 5,186,215 | 2/1993 | Gilleland | 138/98 |
| 5,477,887 | 12/1995 | Catallo | 138/98 X |

FOREIGN PATENT DOCUMENTS

| | | | |
|---|---|---|---|
| 2-164952 A | 6/1990 | Japan | 138/98 |
| 3-117798 A | 5/1991 | Japan | 138/98 |

*Primary Examiner*—Patrick F. Brinson
*Attorney, Agent, or Firm*—Greenblum & Bernstein, P.L.C.

[57] ABSTRACT

A conduit lining system and a method for lining conduits, particularly conduits in need of repair. The system includes a longitudinally extending liner, initially transversely curled in a pre-installation position but being capable of becoming uncurled in an installation position to form a longitudinally extending generally cylindrically shaped liner for placement adjacent an interior surface of a conduit to be lined or repaired. The liner has longitudinally extending locking edges which become mutually engaged as a torpedo-shaped member is inserted within the liner, while in the curled pre-installation position, and the member is moved longitudinally therethrough.

23 Claims, 3 Drawing Sheets

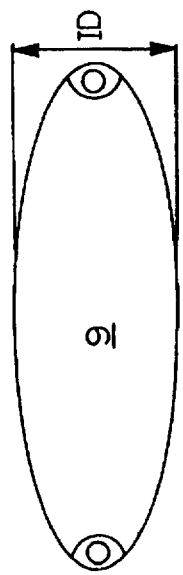
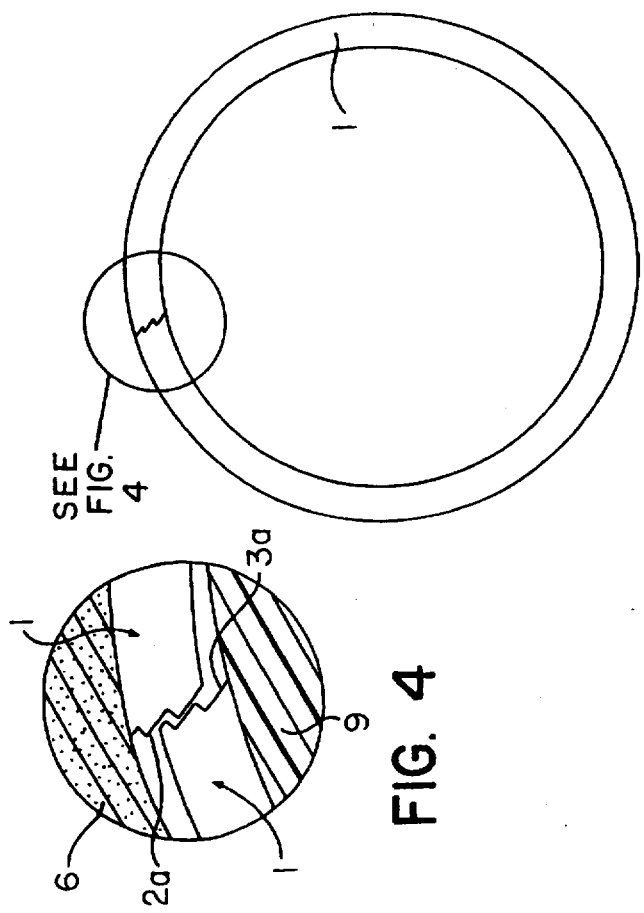
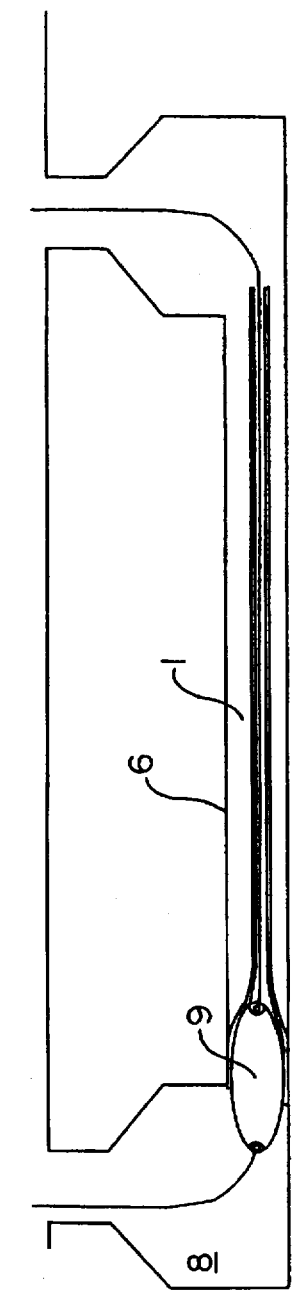

CONDUIT LINING SYSTEM AND METHOD OF LINING A CONDUIT

CROSS-REFERENCE TO RELATED PATENTS

This application claims priority, under 35 USC 119(e) or U.S. provisional application No. 60/006,496, filed on Nov. 9, 1995, the disclosure of which is hereby incorporated by reference thereto in its entirety.

In addition, this application hereby incorporates by reference in their entireties the disclosures of the following two U.S. Pat. No. 5,119,862, issued on Jun. 9, 1992, and U.S. Pat. No. 5,351,720, issued on Oct. 4, 1994.

BACKGROUND OF THE INVENTION

1. Field of the Invention

The present invention relates to systems and methods for lining a conduit. More particularly, the invention is directed to systems and methods for lining such conduits particularly for repairing damaged, weakened, or leaking conduits that are located in areas that are difficult to gain access, for example, sewer pipes or other conduits that are located underground.

2. Description of Background and Related Art

Conduit systems for carrying water or wastewater, for example, and other liquid and fluid conveyance systems, as well as conduit systems that house communication lines, for example, are typically located underground and, in general, are not easily accessible after installation. Such systems are disclosed in the aforementioned U.S. Pat. Nos. 5,119,862 and 5,351,720.

Over a period of time, such conduit systems can become damaged, weakened, or can otherwise begin to leak at the joints between adjacent conduit sections, for example. The problems associated with such systems, and a number of previous repair methods and apparatuses are disclosed, for example, in the aforementioned U.S. Pat. Nos. 5,119,862 and 5,351,720.

SUMMARY OF THE INVENTION

It is an object of the present invention to improve upon known internal conduit lining systems and, particularly, repair systems and methods. Although the present invention is contemplated as having its greatest utility in repairs, it is also contemplated that the lining system of the invention can be employed prior to any need for repair.

The present invention provides methods and systems that do not require significant internal pressures to be applied to the damaged conduit section and, therefore, that do not risk the possibility of additional damage to the damaged and/or weakened conduit section. Still further, conduit joints repaired with the methods and apparatus of the present invention are stabilized, are completely sealed, and the repair is long-lasting.

To this end, the present invention is directed to a linear system for repairing conduits in which a sheet of plastic, spirally coiled in transverse cross section, which, due to its open cross section, can be coiled onto a reel. Such reels of plastic are known.

The longitudinal edges of the open cross section have a matching, or complementary, configuration. Such configuration can take the shape, for example, of matching sawtooth sections for forming a mechanical lock of the spiral sheet into a cylindrical conduit liner.

The spirally curled sheet of plastic, or liner, is pulled into the conduit under repair, a sewer, e.g., from the far access chamber so that the liner is positioned in the sewer end-to-end in the curled configuration.

Once the curled liner is properly placed in position in the sewer, a torpedo-shaped member, or torpedo, is pulled by a cable through the spiral. The diameter (ID) of the torpedo is preferably slightly greater than the desired inside diameter of the liner so that, as the torpedo is pulled through the spiralled liner, the liner is unfurled sufficiently to bring the matching locking edges of the liner into alignment and secure the liner into a desired cylindrical shape adjacent to the inside surface of the conduit under repair.

More specifically, as the maximum diameter of the torpedo passes a given location along the length of the curled liner, the respective longitudinal edges of the liner are slightly over-expanded. As the torpedo passes, due to the internal or locked-in stresses of the material from which the liner is made, the previously curled liner tends to move in the direction to assume its original curled configuration. During such movement, the sawtooth or other matching mechanical locking form of the edges engage and retain the liner in the desired cylindrical configuration. Since the sawteeth, or other mechanical locking forms, are on the longitudinal edge surface of the plastic liner, the resulting cross-section is perfectly circular, rather than overlapped.

Alternatively, instead of slight over-expansion, it is contemplated to form the mutually confronting longitudinally extending edges of the liner as a snap-fit connection, particularly if the liner is made of a plastic, whereby a longitudinally extending projection on one of the two edges is force-fitted into a longitudinally extending groove on the other of the edges. As the torpedo passes along the liner, the longitudinal projection is directly forced into the longitudinal groove without any over-expansion and elastic return movement. In this alternative, it is contemplated that the mutually confronting edge surfaces can be made to be other than 90° from the inner and outer surfaces of the liner to facilitate the aforementioned direct forcing of the projection into the groove. The action being referred to here is analogous to the connection made in sealing certain Zip-Lock brand plastic sandwich bags or other such plastic bags.

In a further embodiment of the invention, the locking of the liner in the uncoiled position can include, in addition to the aforementioned mechanical locking of the edges, the use of a thermosettable, thermoplastic or thermofusible coating on the liner at least near the locking edges so that, after expansion of the liner into the unfurled installation position, the coating is heated, thereby melting same, including the melting of the coating on the locking edges of the liner. Upon removal of the heating source, the edges of the liner are thereby welded together. One method of heating and melting the layer of thermoplastic coating, for example, is by means of resistance elements, i.e., electrical wire, embedded in the coating layer. Once the liner is in place after the aforementioned movement of the torpedo, current is applied to the resistance elements, thereby melting the plastic at the edges and fusing the edges together.

As an alternative, a quantity of solvent can be provided for fusing the locking edges of the plastic liner to fuse the edges chemically.

It is contemplated that the plastic liner can be made of high-density polyethylene or a softer version of PVC. Other plastics can also be used. The torpedo is contemplated as being made from any suitable material, including metals, plastics, alloys, or other materials that are suitable for performing the function described herein and the internal and external structure and shape of the torpedo, as well, can take any appropriate form provided that the torpedo has a sufficient structural integrity for performing its function.

BRIEF DESCRIPTION OF THE DRAWINGS

The above and additional objects, characteristics, and advantages of the present invention will become even more apparent in the following detailed description of preferred embodiments, with reference to the accompanying drawings which are present as non-limiting examples, in which:

FIG. 3 illustrates the liner, in transverse cross section, in an uncurled, installation configuration;

FIG. 4 is a detail illustration of a portion of the liner shown in FIG. 3;

FIG. 5 schematically illustrates a torpedo-shaped member positioned within an end of a length of the curled liner, the liner being positioned within a conduit section to be lined or repaired, whereafter the torpedo-shaped member is moved through the liner to uncurl same to cause the locking edges to become engaged so that the liner will assume its uncurled locked configuration;

FIG. 6 illustrates the torpedo-shaped member; and

DETAILED DESCRIPTION OF THE PREFERRED EMBODIMENTS

With respect to the drawings, only enough of the construction of the invention has been depicted, to simplify the illustration, as needed for those of ordinary skill in the art to readily understand the underlying principles of the invention and, therefore, to permit them to make and use the invention.

Figure 1:
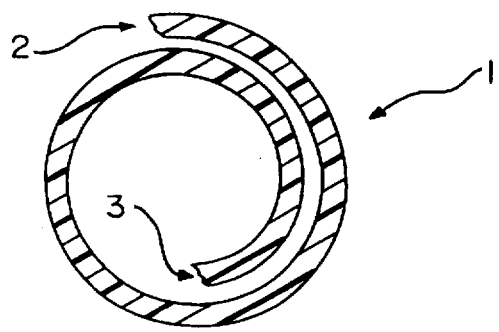
FIG. 1 illustrates the liner of the invention, in transverse cross section, in a curled, pre-installation configuration.

FIG. 1 illustrates a cross-sectional view of the sheet of plastic 1, in a relaxed curled configuration, the sheet being used as a liner for an underground conduit, for example. The liner has a pair of longitudinally extending edge portions 2, 3, which are interlocked in a final configuration, as described below.

Figure 2:
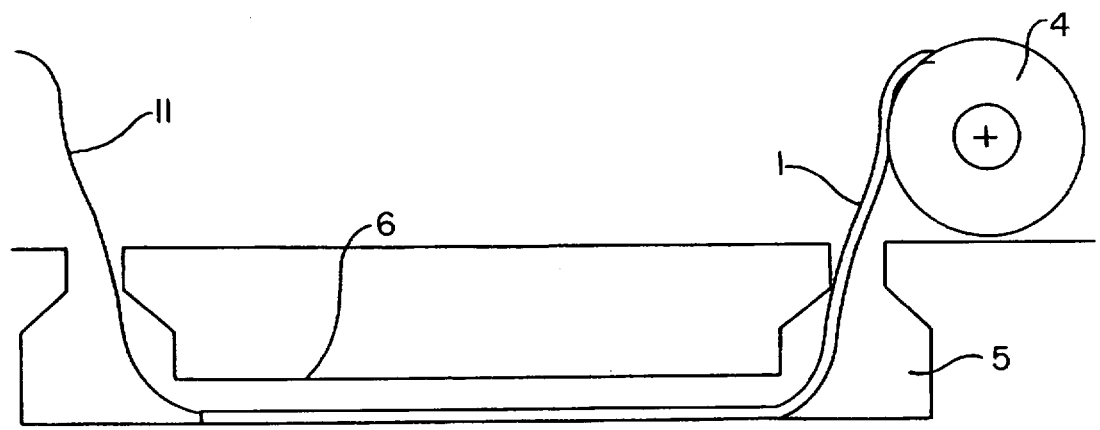
FIG. 2 schematically illustrates the liner being fed from a storage reel, while in the curled pre-installation configuration, into a sewer system for lining at least a portion thereof.

In FIG. 2, the curled liner 1 is shown being fed from a coiled storage reel 4 into a sewer system 5 and, more specifically, within a lengthy pipe or conduit 6 thereof which is in need of repair. An installation cable 11 can be used to exert a pulling force to longitudinally extend the curled liner 1 as the liner is unreeled.

As shown in FIGS. 3 and 4, the longitudinal edges 2, 3 of the curled liner 1 have a matching, or complementary, configuration. Such configuration can take the shape, for example, of matching sawtooth surfaces 2a, 3a, as seen in the detail drawing of FIG. 4. These surfaces 2a, 3a, function as a mechanical lock when the liner is caused to uncurl from the configuration shown in FIG. 1 to the configuration shown in FIG. 3, i.e., into a cylindrical conduit liner.

To accomplish a repair, the liner 1, in the form of a spirally curled sheet of plastic, is pulled by a cable 7 into the conduit or "host pipe" to be lined, such as a sewer, e.g., from the far access chamber 8 so that the liner is positioned in the sewer end-to-end in the curled configuration.

FIG. 5 illustrates the curled liner 1 lying end-to-end in the sewer pipe 6 under repair or, in any case, to be lined by means of the liner. Once the curled liner 1 is properly placed in position in the sewer pipe, a torpedo-shaped member, or torpedo 9, is pulled by the cable 7 through the liner 1. A control cable 10 is attached to an opposite end of the torpedo. Of course, prior to insertion of the torpedo 9, the liner 1 is in its curled configuration as shown in FIG. 1. If necessary, additional section(s) of curled liner can be positioned end-to-end and affixed together by known means, including mechanically connecting or plastic or chemically fusing the ends together.

The diameter (ID) of the liner 1, generally corresponding to the maximum diameter of the torpedo 9, as illustrated in FIG. 6, is preferably slightly greater than the desired inside diameter of the liner 1 so that, as the torpedo is pulled through the curled liner, the liner is unfurled sufficiently to bring the matching locking edges 2, 3 of the liner 1 into alignment and to secure the liner into a desired cylindrical shape adjacent to the inside surface of the conduit or host pipe.

More specifically, as the maximum diameter of the torpedo passes a given location along the length of the curled liner, the respective longitudinal edges of the liner are positioned generally in a mutually confronting relationship so that, as the torpedo passes, due to the internal or locked-in stresses of the material from which the liner is made, the previously curled liner tends to move in the direction to assume its original curled configuration. During such movement, the sawtooth or other matching mechanical locking form 2a, 3a of the edges engage and retain the liner 1 in the desired cylindrical configuration. Since the sawteeth, or other mechanical locking forms, are on the longitudinal edge surface of the plastic liner, the resulting cross-section is essentially perfectly circular, rather than overlapped.

Figure 7:
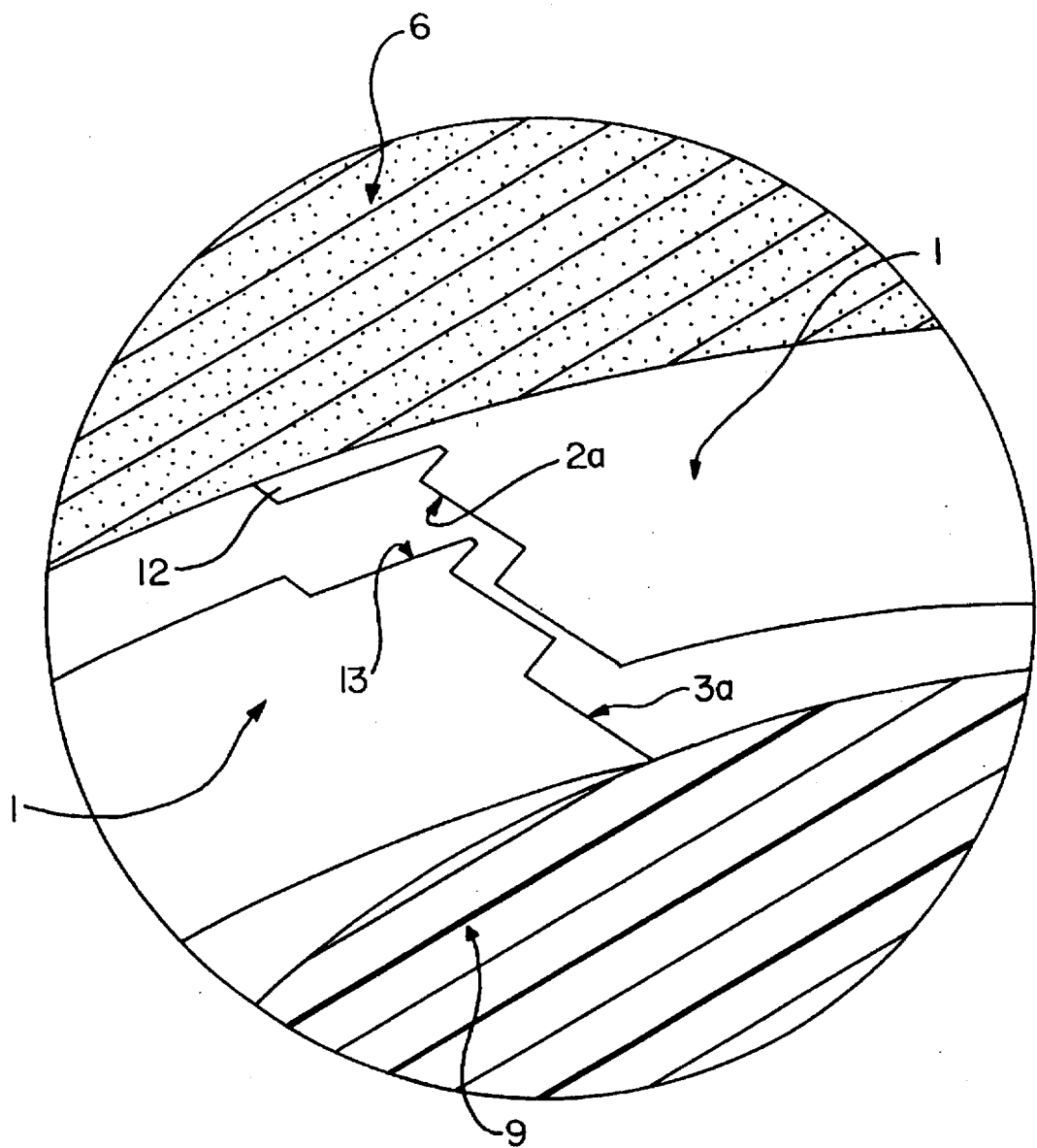
FIG. 7 is similar to FIG. 4 and illustrates an alternative form for the locking edges of the liner.

FIG. 7 illustrates a variation of the locking edges illustrated in FIG. 4. Therein, the sawtooth surface 2a includes an extending portion 12 which becomes positioned, prior to the liner assuming the installation position, against the host pipe 6. During expansion by means of the torpedo member 9, a mating portion 13 of the sawtooth surface 3a becomes engaged with the portion 12 of surface 2a to prevent over-expansion of the liner 1 against the host pipe and to ensure the accurate fitting and locking of the edges 2 and 3 of the liner 1.

In a further embodiment of the invention, particularly in the event the liner were not to be made of a plastic material, the locking of the liner in the uncoiled position can include, in addition to the aforementioned mechanical locking of the edges, the use of a thermosettable, thermoplastic or thermofusible coating on the liner at least near the locking edges so that, after expansion of the liner into the unfurled installation position, the coating is heated, thereby melting same, including the melting of the coating on the locking edges of the liner. Upon removal of the heating source, the edges of the liner are thereby welded together. One method of heating the melting the layer of thermoplastic coating, for example, is by means of resistance elements, i.e., electrical wire, embedded in the coating layer or placed upon the surface of the coating layer at the locking edges. Once the liner is in place after the aforementioned movement of the torpedo, current is applied to the resistance elements, thereby melting the plastic at the edges and fusing the edges together.

As an alternative, a quantity of solvent can be provided for fusing the locking edges of the plastic liner to fuse the edges chemically.

It is contemplated that the plastic liner can be made of high density polyethylene or a softer version of PVC. Other plastics can also be used. The torpedo is contemplated as being made from any suitable material, including metals, plastics, alloys, or other materials that are suitable for performing the function described herein and the internal and external structure and shape of the torpedo, as well, can take any appropriate form provided that the torpedo has a sufficient structural integrity for performing its function.

Finally, although the invention has been described with reference to particular means, materials and embodiments, it is to be understood that the invention is not limited to the particulars disclosed and extends to all equivalents within the scope of the claims.

What is claimed is:

1. A method of lining a conduit with the use of a liner, said liner longitudinally extending and transversely curled in a pre-installation position, said liner having longitudinally extending locking edges, said liner being capable of being uncurled into an installation position to form a longitudinally extending generally cylindrically shaped liner for placement adjacent an interior surface of the conduit to be lined, said method comprising the steps of:

positioning a predetermined length of said liner within the conduit to be lined in said curled pre-installation position of said liner;

placing a torpedo-shaped member at one end of said predeterminate length of said liner; and exerting a force to move said torpedo-shaped member within said liner to move said liner from said curled pre-installation position to said uncurled installation position, whereby movement of said torpedo-shaped member within said liner causes said locking edges of said liner to become engaged thereby locking said liner in place adjacent an interior surface of the conduit to be lined.

2. A method according to claim 1, further comprising:

performing an additional step to enhance locking of said edges of said liner in place.

3. A method according to claim 2, wherein:

said liner is made of plastic; and said additional step comprises melting said edges to fuse said edges together.

4. A method according to claim 2, wherein said liner is made of plastic; and said additional step comprises applying a solvent to said edges to chemically fuse said edges together.

5. A conduit lining apparatus comprising:

a longitudinally extending liner being transversely curled in a pre-installation position, said liner being capable of being uncurled into an installation position to form a longitudinally extending generally cylindrically shaped liner for placement adjacent an interior surface of a conduit to be lined;

said liner having longitudinally extending locking edges; and a member for insertion within said liner in said curled pre-installation position;

said member having a maximum external diameter substantially equal to an internal diameter of said liner in said installation position, whereby when said member is placed at one end of a predeterminate length of said liner in said pre-installation position and is moved longitudinally therethrough, said liner is moved from said curled pre-installation position to said uncurled installation position, whereby said locking edges of said liner become engaged thereby locking said liner in place adjacent an interior surface of the conduit to be lined.

6. A conduit lining apparatus according to claim 5, wherein:

said liner is made of plastic.

7. A conduit lining apparatus according to claim 5, wherein:

said liner is made of high-density polyethylene.

8. A conduit lining apparatus according to claim 5, wherein:

said liner is made of polyvinyl chloride.

9. A conduit lining apparatus according to claim 5, wherein:

said member is torpedo-shaped.

10. A conduit lining apparatus according to claim 5, further comprising:

means for moving said member along said uncurled liner.

11. A conduit lining apparatus according to claim 10, wherein:

said means for moving comprises at least one cable.

12. A method of lining a conduit with the use of a liner, said liner longitudinally extending and transversely coiled in a pre-installation position, said liner having longitudinally extending locking edges, said liner being capable of being uncoiled into an installation position to form a longitudinally extending generally cylindrically shaped liner for placement within an interior surface of the conduit to be lined, said method comprising:

positioning said liner, in said coiled pre-installation, within the conduit to be lined;

placing an uncoiling member at one end of said liner; and propelling said uncoiling member longitudinally within said liner to expand said liner from said coiled pre-installation position, to an over-expanded pre-locked position as said uncoiling member is propelled within said liner, and to said uncoiled locked installation position as said uncoiling member exits said liner, whereby said locking edges of said liner become engaged thereby locking said liner in place within an interior surface of the conduit to be lined.

13. A method according to claim 12, further comprising:

following said engagement of said locking edges of said liner, performing a step to enhance locking of said edges of said liner in place.

14. A method according to claim 13, wherein:

said liner is made of plastic; and said step comprises melting said edges to fuse said edges together.

15. A method according to claim 13, wherein:

said liner is made of plastic; and said step comprises applying a solvent to said edges to chemically fuse said edges together.

16. A conduit lining apparatus comprising:

a longitudinally extending liner being transversely coiled in a pre-installation position, said liner being capable of being uncoiled into an installation position to form a longitudinally extending generally cylindrically shaped liner for placement within an interior surface of a conduit to be lined;

said liner having longitudinally extending locking edges; and a member for insertion within said liner in said coiled pre-installation position;

said member having a maximum external diameter slightly greater than an internal diameter of said liner in said installation position, whereby when said member is placed at one end of a predeterminate length of said liner in said pre-installation position and is moved longitudinally therethrough, said liner is moved from said coiled pre-installation position, to a slightly over-expanded pre-locked position, and to said uncoiled installation position, whereby said locking edges of said liner become engaged thereby locking said liner in place within an interior surface of the conduit to be lined.

17. A conduit lining apparatus according to claim 16, wherein:

said liner is made of plastic.

18. A conduit lining apparatus according to claim 16, wherein:

said liner is made of high-density polyethylene.

19. A conduit lining apparatus according to claim 16, wherein:

said liner is made of polyvinyl chloride.

20. A conduit lining apparatus according to claim 16, wherein:

said member is torpedo-shaped.

21. A conduit lining apparatus according to claim 16, further comprising:

means for moving said member along said uncoiled liner.

22. A conduit lining apparatus according to claim 21, wherein:

said means for moving comprises at least one cable.

23. A conduit lining apparatus according to claim 5, wherein:

said member has a structural integrity, said structural integrity comprises means for exerting an internal force for uncurling said liner in said curled pre-installation position as said member is moved longitudinally through said liner.

* * * * *